Oct. 31, 1967  AKIO YAMASHITA  3,350,610
ELECTRIC CHARGE STORAGE ELEMENTS
Filed March 10, 1964  8 Sheets-Sheet 1

Inventor
Akio Yamashita
By Stevens, Davis, Miller & Mosher
ATTORNEYS

United States Patent Office 3,350,610
Patented Oct. 31, 1967

3,350,610
ELECTRIC CHARGE STORAGE ELEMENTS
Akio Yamashita, Ikeda-shi, Japan, assignor to Matsushita Electric Industrial Co., Ltd., Osaka, Japan, a corporation of Japan
Filed Mar. 10, 1964, Ser. No. 350,905
Claims priority, application Japan, Mar. 16, 1963, 38/14,538
6 Claims. (Cl. 317—234)

ABSTRACT OF THE DISCLOSURE

A multilayer electrical charge storage element comprising a mixture layer including at least an electrical insulator and a semiconductor, a carrier transformer layer on one side of the mixture and an electrical insulator layer on the opposite side of the mixture with an electrode disposed in contact with the latter electrical insulator.

---

The present invention relates to an entirely novel electric charge storage element which is suitable for various electrical applications including electrophotography, audio and video recording and other services.

Heretofore, a mixture of a semiconductor and an insulator has found its applications in a photoamplifier and sensitive paper for use in electrophotography. A photoamplifier comprises an electroluminescent element connected in series with a photoconductor in the form of cadmium sulfide, in which the cadmium sulfide photoconductor or semiconductor is generally dispersed in an electrical insulator in the form of a synthetic resin. In such photoamplifier, however, a layer of the above-described photoconductor is disposed in tiered relation on an electroluminescent layer in which an electroluminescent phosphor including a fluorescent phosphor having a semiconductive property is mixed into an electrical insulator, or a current diffusion layer of cadmium sulfide and an opaque layer of carbon is placed between the photoconductive layer and the electroluminescent layer. Sensitive paper for electrophotography having thereon a sensitive material is sold by the commercial name of Electrofax, and comprises a sensitive layer applied on a sheet of paper, which sensitive layer has ZnO, being one of N-type oxide semiconductors, mixed into an electrical insulator. In the sensitive paper, however, the sensitive layer is spaced from an electrode in order that a corona discharge phenomenon may be utilized to charge the sensitive layer.

The invention provides an electric charge storage element of a structure which is entirely different from those of conventional design, and the electric charge storage element of the invention acts in a way that has not been known in the prior art. Or more precisely, the invention relates to an electric charge storage element which comprises a mixture of at least an electrical insulator and a semiconductor brought into contact with a carrier transformer, such as a conductor or a semiconductor, and with an electrical insulator, whereby an electric charge of the same polarity with that of the carrier transformer can be stored in the mixture. Herein, the term "semiconductor" is given to such devices among solid state bodies that have electrical conductivity due to the movement of electrons and that do not show electrical conductivity at the absolute zero of temperature but show substantial electrical conductivity at higher temperatures because of conductive electrons being generated therein at higher temperatures.

The primary object of the invention is to provide an electric charge storage element which comprises a mixture of at least a semiconductor and an electrical insulator, a carrier transformer brought into contact with the mixture, another electrical insulator brought into contact with the mixture on the opposite side of the carrier transformer, and an electrode disposed on the another electrical insulator on the opposite side of the mixture, whereby to store in the mixture of the semiconductor and the electrical insulator a great amount of electrical charge of the same polarity with that of the carrier transformer in contact with the mixture.

Another object of the invention is to provide an electric charge storage element of said character in which the electrode is directly brought into contact with the another insulator.

Still another object of the invention is to provide an electric charge storage element of said character in which the electrode is indirectly brought into contact with the another insulator through another layer placed therebetween.

Yet another object of the invention is to provide an electric charge storage element of said character in which the semiconductor included in the mixture takes the form of a P-type semiconductor, whereby to store in the mixture a further greater amount of electric charge of the same polarity with that of the carrier transformer in contact with the mixture.

Further another object of the invention is to provide an electrical device of said character in which a fluorescent phosphor is added to the mixture, whereby to store in the mixture an electric charge of the same polarity with that of the carrier transformer in contact with the mixture and to vary the amount of electric charge by application of light thereto.

A further object of the invention is to provide an electric charge storage element of said character in which a ferroelectric substance is added to the mixture, whereby to store in the mixture a further greater amount of electric charge of the same polarity with that of the carrier transformer in contact with the mixture.

A still further object of the invention is to provide an electric charge storage element of said character in which a fluorescent phosphor and a ferroelectric substance are added to the mixture whereby to store in the mixture an electric charge of the same polarity with that of the carrier transformer in contact with the mixture and to vary the amount of electric charge by application of light thereto.

A yet further object of the invention is to provide an electric charge storage element of said character in which the mixture of the semiconductor and the insulator further includes a metal generating a photo-electromotive force in combination with the semiconductor in the mixture, whereby to store in the mixture an electric charge of the same polarity with that of the carrier transformer in contact with the mixture and to vary the amount of electric charge by application of light thereto.

Another object of the invention is to provide an electric charge storage element of said character in which the another electrical insulator takes the form of such material as polystyrene or polyethylene having little residual electric charge due to absorption current, whereby to store in the mixture an electric charge of the same polarity with that of the carrier transformer in contact with the mixture and to prevent the amount of electric charge from decreasing by an alternating electric field applied across the mixture.

Still another object of the invention is to provide an electric charge storage element of said character in which a fluorescent layer including a fluorescent phosphor therein is superposed on the another insulator in contact with the mixture, and the transparent conductive glass plate is superposed on the fluorescent layer, whereby to store in the mixture an electric charge of the same polarity with that of the carrier transformer in contact with the mixture and to vary the amount of electric charge by application of light thereto.

Yet another object of the invention is to provide an electric charge storage element of said character in which a photoconductive layer including therein a photoconductor is superposed on the other insulator in contact with the mixture, and the transparent conductive glass plate is superposed on the photoconductive layer, whereby to store in the mixture an electric charge of the same polarity with that of the carrier transformer in contact with the mixture and to vary the amount of electric charge by application of light thereto.

There are other objects and particularities of the invention which will become obvious from the following description with reference to the accompanying drawings, in which.

Figure 1:
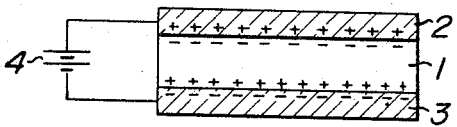
FIG. 1 is a schematic sectional view of a conventional insulating element.

The invention will now be explained with reference to the drawings. When D.C. voltage is applied across a common electrical insulator placed between electrodes, electric charges produced on the respective faces of the insulator have opposite polarities to those of the electrodes with which it is in contact. Or more precisely, when D.C. voltage derived from a D.C. source 4 is applied across electrodes 2 and 3 having an electrical insulator 1 placed therebetween as shown in FIG. 1, a layer of negative charges is formed at the boundary of the insulator 1 where it contacts the anode 2, while a layer of positive charges is formed at the boundary of the insulator 1 where it contacts the cathode 3. In order to produce a great amount of electric charge in the insulator 1, there is a method which utilizes the persistent internal polarization effect of a fluorescent phosphor. According to this method, the insulator 1 comprises a mixture of an organic insulating material and a fluorescent phosphor and D.C. voltage is applied across the insulator to cause polarization therein. The polarization can be increased by illumination thereon and persisted for a long time in a dark space. Even in this case, layers of electric charges of opposite polarities to those of the electrodes are formed at the boundaries of the insulator with the electrodes as in the former case.

Figure 2:
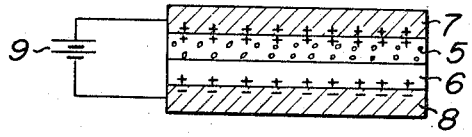
FIG. 2 is a schematic sectional view of an embodiment of an insulating element according to the invention.

The elements of the present invention are entirely different from such conventional elements. According to the invention, an electric charge of the same polarity with that of a carrier transformer, such as a conductor or a semiconductor, is stored in a mixture of a semiconductor and an electrical insulator which is in contact with the carrier transformer. In FIG. 2, the electric charge storage element of the invention is schematically shown which comprises a mixture layer 5 of an electrical insulator and a semiconductor and an electrical insulator layer 6 placed between electrodes 7 and 8 which are connected to a D.C. source 9. When, as shown in FIG. 2, D.C. voltage is applied across the electrodes 7 and 8, a unipolar electric charge is stored in the mixture 5 and the insulator 6. Such effect was discovered by the inventor and designated as a unipolar charge storage effect by the inventor. The inventor considers that such effect is caused by the injection of electric charges from the electrode 7 into the mixture 5. The inventor infers in such a way because, if an electrical insulator may be interposed between the electrode 7 and the mixture 5, the electric charge stored in the mixture 5 will have an opposite or negative polarity.

Hereinafter, the electric charge storage element with such feature of the invention will be explained in more detail. In this invention, any of the well-known semiconductors such as Se, $Cu_2O$, ZnO, NiO, PbO, Si, Ge, CdS, ZnSe and anthrocene may be used, and any of electrical insulators such as glass, porcelain, sulphur, silicone resin polyvinyl chloride, polyvinyl acetate, epoxy resin, polyvinyl butyral and wax may be used. There may be many methods for manufacturing a material having the unipolar charge storage effect by the use of these semiconductors and insulators. One of the methods includes mixing the semiconductor with the insulating material of organic nature such as the resin or wax, while another method includes mixing the semiconductor with the insulating material of inorganic nature such as glass, porcelain or sulfur. The prominent effect of the invention is also attained by the addition of a fluorescent body such as ZnS, (Zn, Cd)S or $SnSiO_4$, or a dielectric such as $TiO_2$, $Al_2O_3$, $BaTiO_3$ or $SrTiO_3$ to these mixtures. Further, a metal which develops a photovoltaic effect through contact with the semiconductor in the mixture may be added to attain the prominent effect of the invenion.

1. Basic characeristics

Description will hereinunder be made with regard to basic characteristics of the electric charge storage element of the invention. The effect of the invention will not vary by employing whichever of a conductor or a semiconductor as a carrier transformer. A mixture including 70% by weight of $Cu_2O$, one of P-type oxide semiconductors, and 30% by weight of silicone resin is prepared and coated on a sheet of paper. The paper carrying the mixture thereon is placed between two electrodes in order to obtain a structure as shown in FIG. 2. For the sake of comparison, a mixture including 70% by weight of (Zn, Cd)S, being a fluorescent body showing a persistent internal polarization effect, and 30% by weight of silicone resin is prepared and interposed between two electrodes in order to obtain a conventional structure as shown in FIG. 1.

1-1. Voltage characteristic

Figure 3:
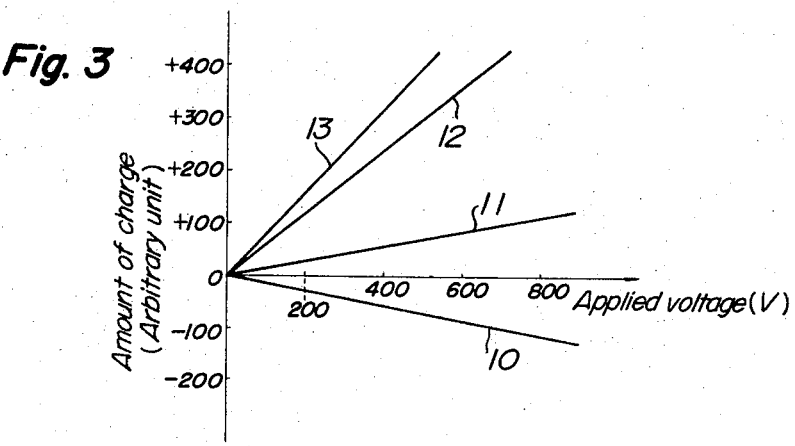
FIG. 3 is a graphic illustration of a relation between an amount of electric charge and applied D.C. voltage in the inventive and prior elements.

FIG. 3 shows a relation between an amount of electric charge and applied voltage when D.C. voltage is applied for 4 minutes to the inventive and prior elements. In FIG. 3, the positive value shows an amount of positive charge and the negative value an amount of negative charge. Curves 10 and 11 represent the characteristic of the prior element wherein the curve 10 shows a variation in the amount of charge at the surface of the mixture layer at which it is in contact with the anode, while the curve 11 shows a variation in the amount of charge at the surface of the mixture layer at which it is in contact with the cathode. From the curves 10 and 11, it will be seen that negative charges are induced on the surface of the mixture layer at which it is in contact with the anode and positive charges are induced on the surface in contact with the cathode. Curves 12 and 13 show the case of the invention, in which the curve 12 shows a variation in the amount of charge at the surface of the mixture layer at which it is in contact with the anode and the curve 13 shows a variation in the amount of charge at the surface of the insulator layer at which it is in contact with the cathode. From the curves 12 and 13, it will be seen that the electric charge of the same polarity with that of the electrode with which the mixture layer is in contact is stored in the mixture layer. This is the unipolar charge storage effect which has not been found heretofore. The amounts of stored charges increase rectilinearly with relation to the applied voltage, and the effect of the invention appears already in a low voltage range. Therefore, it will be known that such effect is not produced by some secondary cause such as local discharge, but by a principle that is quite different from prior principles.

1–2. Voltage application time characteristic

Figure 4:
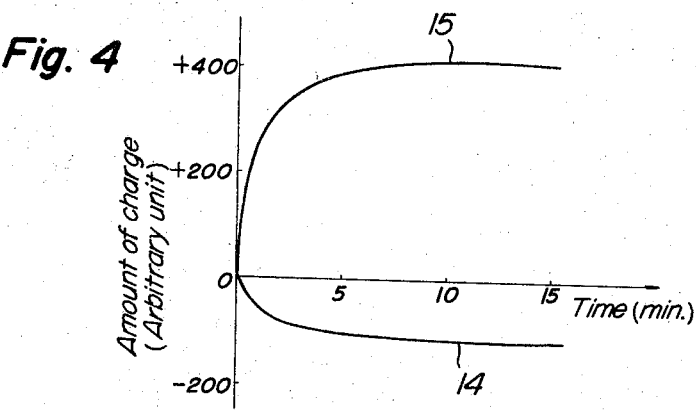
FIG. 4 is a graphic illustration of a relation between a time of D.C. voltage application and an amount of electric charge in the inventive and prior elements.

FIG. 4 shows a relation between a time of voltage application and an amount of electric charge when D.C. voltage of 600 volts is applied across the samples. A curve 14 therein shows a case of the prior element and it will be seen that negative charges are obtained on the side of the anode. In a curve 15 showing the case of the invention, positive charges are obtained on the side of the anode. In both cases, the stored charges abruptly increase simultaneously with the application of voltage and saturation takes place after about four minutes. These curves can be approximately-expressed as a formula $$P = P\infty [1 - \exp(-\lambda t)]$$

where $P\infty$ is an amount of charge after application of voltage for a long period, and $\lambda$ is a constant which is compared with a reciprocal of a dielectric relaxation time.

1–3. Natural decay characteristic

Figure 5:
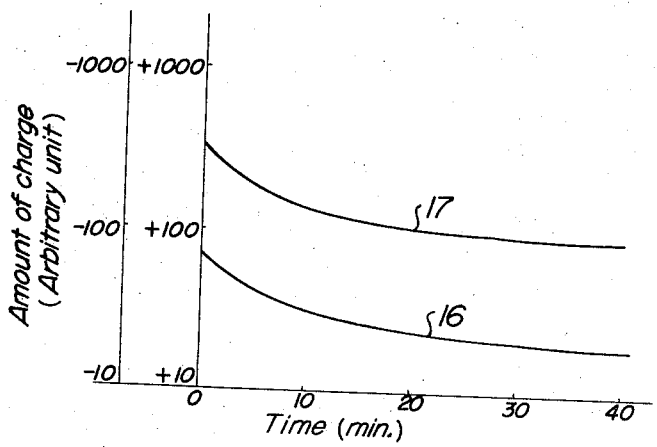
FIG. 5 is a graphic illustration of a natural decay characteristic of stored electric charges in the inventive and prior elements.

FIG. 5 shows a variation in the amount of stored charge with relation to time when the inventive and prior elements are left to stand, or a natural decay characteristic. Curves 16 and 17 show such characteristic when measurement is taken on the side of the anodes of the prior and inventive elements, respectively. It will be seen from the curves that the amount of stored charge decreases greatly in an initial period of time and the decay becomes gradually less thereafter. These curves can be approximately expressed as a formula $$P = P_0 \exp(-t/\tau)$$

where $P_0$ is a constant and $\tau$ is a time constant.

From the foregoing description with regard to the basic characteristics of the element of the invention, it will be understood that, by the feature of the invention, it is possible to store in a mixture of a semiconductor and an insulator an electric charge of the same polarity with that of an electrode with which the mixture is in contact and to obtain a greater amount of charge than with the prior element. Therefore, the electric charge storage element of the invention is advantageous in that loss of electric charge is less when the electrode is spaced from the mixture due to the fact that both have the same polarity and in that a good sensitivity can be obtained owing to a great amount of electric charge stored therein.

2. Effect of different compositions of mixture

Description will now be made with regard to the effect of various semiconductors used in the mixture and addition of fluorescent phosphors, ferroelectric substances and metals thereto.

Figure 6:
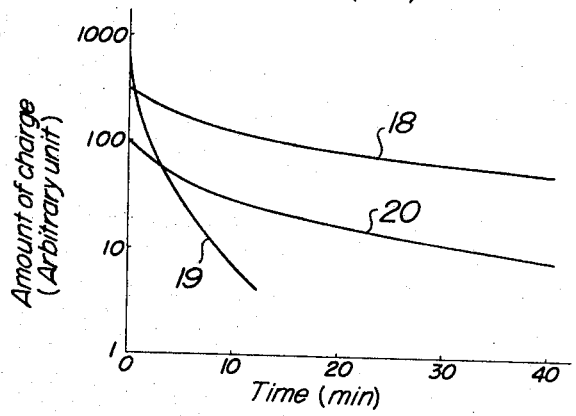
FIGS. 6-13 are graphic illustrations of various characteristics of the inventive insulating element with the mixture of different compositions.

2–1. Effect of P-type semiconductor $Cu_2O$ which is a P-type semiconductor is mixed with an organic electrical insulator in the form of silicone resin. The mixture is coated on a polyethylene telephthalate film, being an electrical insulator, to obtain a structure as shown in FIG. 2. After application of D.C. voltage of 600 volts for one minute, measurement is taken of an amount of charge at the surface of the mixture on the side of the anode to obtain the natural decay characteristic, and a curve 18 in FIG. 6 is obtained. In this case, positive charges are also stored in the mixture on the anode side thereof. In case Se, one of similar P-type semiconductors, is used, a curve 19 in FIG. 6 is obtained under the same condition. From the curve 19, it will be apparent that, though a great amount of electric charge is stored in the initial period of time, its decay is quite rapid.

2–2. Effect of N-type semiconductor

ZnO is used as a N-type semiconductor and silicone resin is used as an electrical insulator. In this case, an unipolar electric charge is also stored by the application of voltage as in the case of foregoing paragraph 2–1, but an amount of electric charge is less than about one half of the case of $Cu_2O$. The stored electric charges can be preserved for a long period in a dark space, but, in the case of ZnO, decay of the charges is slightly more rapid than in the case of $Cu_2O$, as shown by a curve 20 in FIG. 6. The N-type semiconductor has a remarkably smaller amount of stored charge than in the P-type semiconductors and similar results have been obtained on other N-type semiconductors. Especially when CdS, another N-type semiconductor, is used, almost no charge can be stored.

2–3. Effect of joint use of semiconductor and fluorescent phosphor

A P-type semiconductor in the form of $Cu_2O$, an organic insulator in the form of silicone resin and a fluorescent phosphor in the form of (Zn, Cd)S are mixed together with a solvent in the form of toluene, coated on a sheet of paper of insulating material, and sufficiently dried. As electrodes, a brass plate and a plate of transparent conductive glass having thereon a tin oxide film are used. The glass electrode is used for the purpose of observing an effect of illumination on the mixture.

Figure 7:
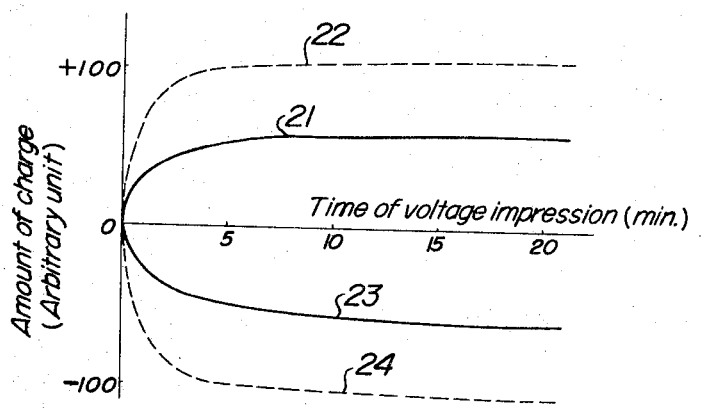

A sample without $Cu_2O$ therein, that is, a sample in which powder of (Zn, Cd)S is solely dispersed in silicone resin is prepared and D.C. voltage of 600 volts is applied thereon in a dark space or with illumination thereon. Then, a layer of negative charges is formed on the anode side of the mixture and a layer of positive charges is formed on the cathode side. FIG. 7 shows a relation between an amount of charge thereby formed and a time of voltage application. Curves 21, 22, 23 and 24 in FIG. 7 show a case wherein voltage is applied in a dark space and measurement is taken on the cathode side, a case wherein voltage is applied simultaneously with illumination with light of 50 luxes and measurement is taken on the cathode side, a case wherein voltage is applied in a dark space and measurement is taken on the anode side, and a case wherein voltage is applied simultaneously with illumination with light of 50 luxes and measurement is taken on the anode side, respectively. From the curves, it will be seen that, in the silicone resin wherein the fluorescent phosphor is dispersed, layers of electric charges having the polarities opposite to those of the electrodes are formed.

Figure 8:
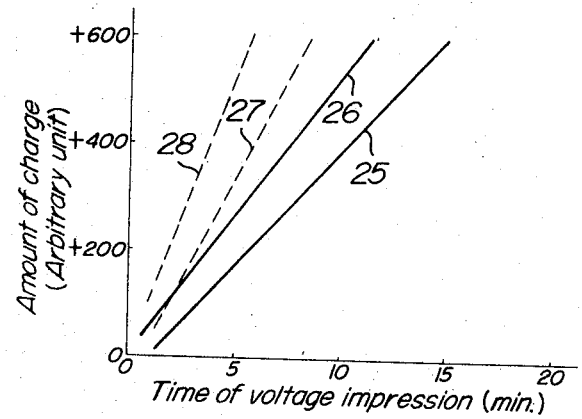

Then the semiconductor, $Cu_2O$, is mixed with the fluorescent phosphor, (Zn, Cd)S, at a ratio of 1 to 10 and the mixture is dispersed in the silicone resin to obtain a sample. By applying D.C. voltage of 600 volts thereto in the above manner, an unipolar electric charge is stored in the sample. FIG. 8 shows a relation between an amount of charge and a time of voltage application in this case. Solid lines 25 and 26 show a case wherein voltage is applied in a dark space and measurement is taken on the anode side, and a case wherein voltage is applied in a dark space and measurement is taken on the cathode side, respectively. Dotted lines 27 and 28 show cases wherein voltage is applied while illuminating with light of 50 luxes and measurement is taken on the anode and cathode sides, respectively. It will thus be seen that, by the addition of the semiconductor or $Cu_2O$, the mixture stores therein an electric charge of the same polarity with that of the electrode with which it contacts and the amount of stored charge is extremely great. Further, the amount of charge increases in proportion to the time of voltage application. The unipolar electric charge thus formed can be stored for an extended period of time especially even in a light space. The charge may be extinguished by application of an infrared light or by heating.

Figure 9:
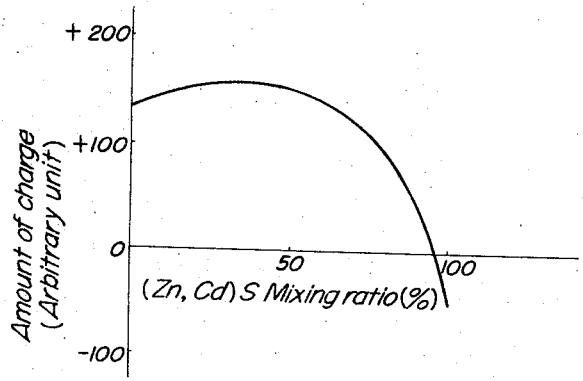

Then, a sample including 30% of an insulator or silicone resin and 70% of a mixture of a semiconductor or $Cu_2O$ and a fluorescent phosphor or (Zn, Cd)S is prepared, and the mixing ratio of (Zn, Cd)S in the mixture is varied to obtain a relation between an amount of charge and the mixing ratio of (Zn, Cd)S, which is shown in FIG. 9. The amount of charge is measured on the anode side. It will be seen that positive charges are obtained by the mixture including the semiconductor, $Cu_2O$, of about 2% and the unipolar charges can thereby be stored. In the case of the mixture of $Cu_2O$ and the silicone resin, there is virtually no increase in electric charges by illumination, but addition of (Zn, Cd)S is effective to increase the amount of charge when light is applied thereto.

*2–4. Effect of joint use of semiconductor and ferroelectric substance*

Figure 10:
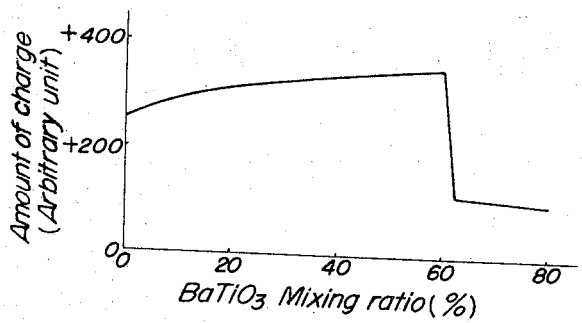

A P-type semiconductor in the form of NiO is mixed at various ratios with a ferroelectric substance in the form of $BaTiO_3$ and silicone resin is used as an insulator. The mixture of these elements is coated on polyethylene telephthalate film to obtain a structure as shown in FIG. 2 and voltage is applied thereto. As a result thereof, an electric charge of the same polarity with that of the electrode 7 is stored in the mixture 5. FIG. 10 shows a variation in the amount of stored charge when the mixing ratio of $BaTiO_3$ to NiO is varied. It will be seen that the amount of charge increases at the $BaTiO_3$ content of less than 60%, by weight but abruptly decreases when the $BaTiO_3$ content exceeds 60% by weight. This tendency is quite similar for other ferroelectric substances.

*2–5. Effect of joint use of semiconductor, fluorescent phosphor and ferroelectric substance*

Figure 11:
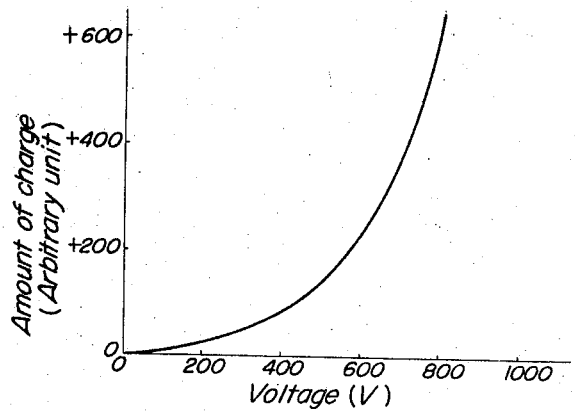

A semiconductor in the form NiO, a fluorescent phosphor in the form of (Zn, Cd)S and a ferroelectric substance in the form of $BaTiO_3$ are mixed at a ratio of 80:10:10 and dispersed in silicone resin to prepare a sample. FIG. 11 shows a relation between an amount of charge and applied voltage when voltage is applied across the sample in a dark space. Measurement is likewise taken on the anode side, and it will be seen that the charge of the same polarity with that of the electrode with which the mixture contacts is stored in the mixture. It will thus been known that, by the addition of the fluorescent phosphor and the ferroelectric substance, the amount of charge increases in a logarithmic manner and great increase is effected especially in a high-voltage region.

*2–6. Effect of joint use of semiconductor and metal*

Figure 12:
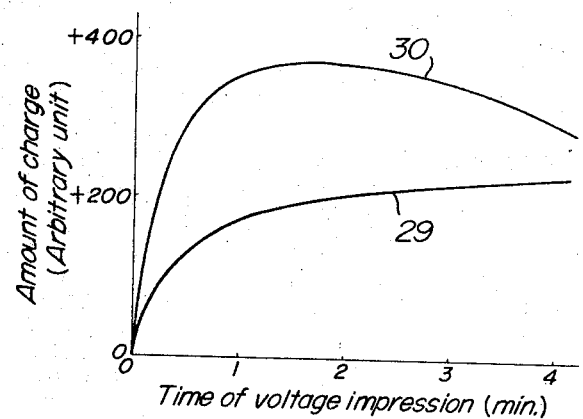

The effect of the invention can equally be obtained with a mixture of a semiconductor and a metal. Especially by employing a metal which, through contact with a semiconductor, may develop a photovoltaic effect, it is possible to vary an amount of charge stored in the mixture depending on an amount of light applied thereto. $Cu_2O$ is now selected as the semiconductor showing the photovoltaic effect. $Cu_2O$, Cu and silicone resin are mixed at a ratio of 65%, 5% and 30%. In this case, both of $Cu_2O$ and Cu are mixed in a powdered state. The mixture is coated on a Mylar film to provide a sample. The powder of $Cu_2O$ and Cu may preferably have a similar grain size and may be as fine as possible, or in the order of 2 to 3 microns. This sample is incorporated in a structure as shown in FIG. 2 and voltage is applied thereon in a dark or a light space. A plate of transparent conductive glass is used as the electrode 7 in order to observe an effect of illumination. FIG. 12 shows a relation between an amount of charge (in an arbitrary unit) stored in the mixture layer and a time of application of voltage of 600 volts with the transparent electrode 7 operating positive. Curves 29 and 30 show the characteristic in the dark space and the characteristic when illuminated with light of 100 luxes simultaneously with the voltage application, respectively. From FIG. 12, it will be apparent that the amount of stored charge increases by the illumination, and in both cases, a positive charge is stored and has the same polarity with that of the electrode with which the mixture layer contacts. This is considered that the amount of charge is increased due to the photovoltaic effect produced by the combination of $Cu_2O$ and Cu when subjected to light. It is further considered that this increased charge is not evolved from the interior of the mixture layer by the photovoltaic effect, but by additional charges drawn out of the electrode by an electric field produced by the photovoltaic effect.

Figure 13:
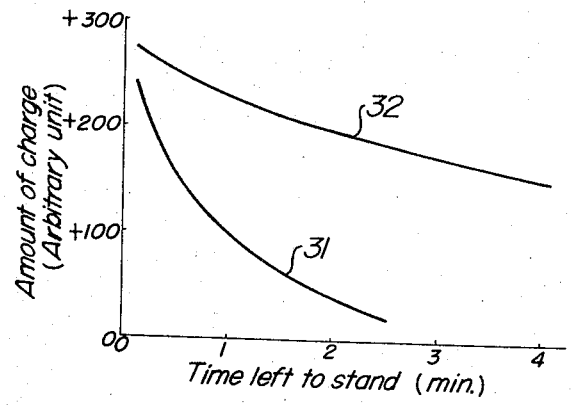

FIG. 13 shows a decay of the stored charges when the sample is left to stand in a dark and a light space. A curve 31 therein shows a variation in the amount of charge stored in the mixture layer when voltage of 600 volts is applied across the sample for one minute in a dark space with the transparent electrode operating positive and then the sample is left to stand in the dark space. A curve 32 shows a variation in the amount of charge stored in the mixture layer when a voltage of 600 volts is likewise applied across the sample for one minute in a dark space with the transparent electrode operating positive and then the sample is left to stand while being illuminated with light of 100 luxes. From the curves, it will be seen that the charge decreases less in the light space than in the dark space. It is considered that this is because an electric field is formed by the photovoltaic effect between $Cu_2O$ and Cu by the application of light and any extinction of the charge is thereby prevented. These phenomena are also observed, for example, in the combination of Se and Cd, and Si of P-type and N-type, in addition to the above-described combination of $Cu_2O$ and Cu.

*3. Effect of residual electric charge in insulator*

In the electric charge storage element of the invention, the insulator 6 as shown in FIG. 2 is absolutely necessary. This insulator has a remarkable influence on the unipolar charge storage effect, and a great amount of stored charge can be obtained by virtue of the presence of the insulator. Next description will be directed to the effect of such insulator.

Figure 14:
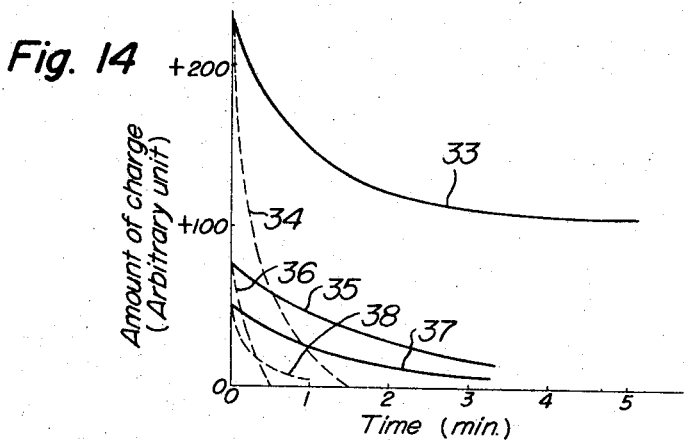
FIGS. 14-15 are graphic illustrations of the effect of insulators on the natural decay characteristic of stored charges in the inventive insulating element.
Figure 15:
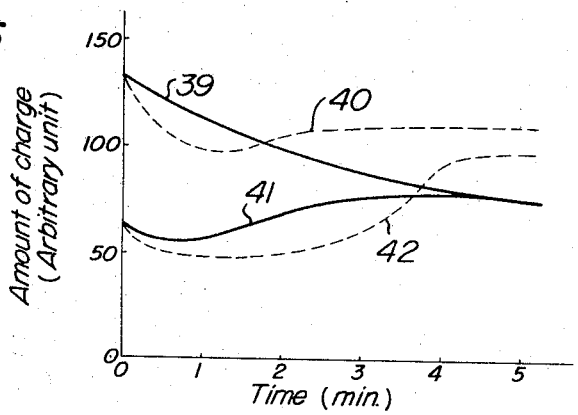

A P-type semiconductor such as $Cu_2O$ is mixed with silicone resin as in the former cases, and the mixture is coated on various insulators in order to provide samples having a structure as shown in FIG. 2. D.C. voltage and A.C. voltage are applied across the samples in superposed relation. In FIGS. 14 and 15, solid lines show a natural decay characteristic, or a variation in an amount of stored charge when the charge is first stored in the samples by the impression of D.C. voltage of 200 volts and A.C. voltage of 100 volts and subsequently the samples are left to stand at no load, while dotted lines therein show a relation between an amount of stored charge and a time of A.C. voltage application when A.C. voltage of 100 volts is solely applied. Curves 33 and 34, 35 and 36, and 37 and 38 in FIG. 14 represent the cases of a polyethylene terephthalate film, paper and a cyanoethyl-cellulose, respectively, while curves 39 and 40, and 41 and 42 in FIG. 15 represent the cases of polystyrene and polyethylene, respectively. Prominent results thereby obtained are that, although the charge decreases by the application of A.C. voltage in the Mylar film, paper and cyanoethyl-cellulose in which exists a residual electric charge due to absorption current, the charge would not decrease by the application of A.C. voltage in the polystyrene and polyethylene in which there exists almost no residual electric charge due to absorpttion current as shown in FIG. 15.

The foregoing has been described as to the electric charge storage element of a structure as shown in FIG. 2, and even if the mixture layer 5 of the semiconductor and insulator is further interposed between the insulator 7 and the electric charge carrier body 8, the principle of the present invention is still applicable and the effectiveness thereof does not change.

4. Effect of superposition of another layer on insulator layer

In the foregoing, description has been made with regard to the electrical device having the structure as shown in FIG. 2. Hereinunder, description will be made with regard to a structure wherein a fluorescent layer including a fluorescent phosphor therein or a photoconductive layer including therein a photoconductor is superposed on the insulator 6 of FIG. 2.

Figure 16:
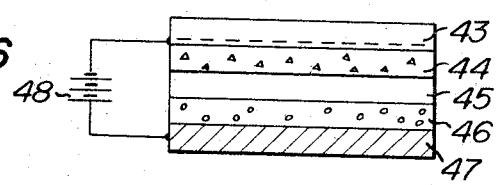
FIG. 16 is a schematic sectional view of another embodiment of the invention.

4–1. Superposition of fluorescent layer including therein fluorescent phosphor By superposing a fluorescent layer or a layer including therein a fluorescent phosphor on the insulator layer, an amount of electric charge can be varied by application of light thereto. FIG. 16 shows a structure of such device, which comprises a plate 43 of transparent conductive glass, a layer 44 including a fluorescent phosphor having an internal polarization effect, a layer 45 of an insulator, a layer 46 of a mixture of a semiconductor and an insulator, and a metallic electrode 47. When, in this device, D.C. voltage is applied across the transparent conductive glass electrode 43 and the metallic electrode 47, a layer of charges having the same polarity with that of the electrode 47 is formed at the face of the mixture layer 46 at which it contacts with the metallic electrode 47. When light is applied from the side of the transparent conductive glass plate 43, the amount of charge in the fluorescent layer 44 varies and the amount of charge in the mixture layer 46 is thereby varied.

Figure 17:
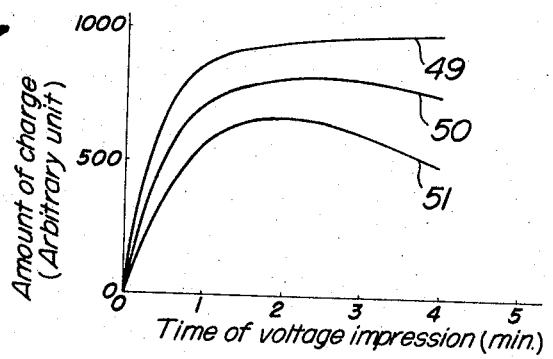
FIGS. 17 and 18 are graphic illustrations of various characteristics of the inventive device of FIG. 16.

Now, suppose that the device of FIG. 16 comprises the fluorescent layer 44 of a mixture of (Zn, Cd)S and silicone resin, the insulator layer 45 of a Mylar film, and the mixture layer 46 and $Cu_2O$ and silicone resin. FIG. 17 shows a relation between an amount of charge at the surface of the mixture layer 46 on the side of the metallic electrode 47 and a time of voltage application when D.C. voltage of 500 volts is applied across such device while applying light of various illuminations. Curves 49, 50, and 51 therein show a case of voltage application in a dark space and cases of illumination with light of 20 luxes and 40 luxes simultaneously with voltage application, respectively. It will be seen that any of the charges has the same polarity with that of the metallic electrode 47 and the amount of charge varies depending upon the illumination of light.

Figure 18:
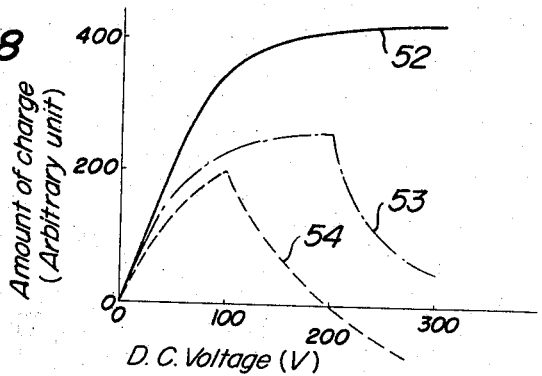

4–2. Superposition of photoconductive layer including therein photoconductor In place of the fluorescent layer, a photoconductive layer or a layer including therein a photoconductor may be superposed on the insulator layer to vary the amount of charge by application of light. A photoconductor layer is substituted for the fluorescent layer in the structure of FIG. 16. The photoconductor layer comprises powder of cadmium sulfide dispersed in silicone resin and is coated in a thickness of about 60 microns on a plate of transparent conductive glass. Then, a Mylar film of 12 microns in thickness is bonded on the photoconductor layer, and a mixture layer comprising $Cu_2O$ powder dispersed in silicone resin is coated thereon in a thickness of 60 microns. A brass plate is used as an opposed electrode to obtain a structure as shown in FIG. 16. D.C. and A.C. voltages are impressed in superposed relation across the transparent conductive glass electrode and the metallic electrode. The A.C. voltage has a value of 100 volts at 60 cycles and the D.C. voltage is varied over various values with the metallic electrode operating positive. A curve 52 in FIG. 18 shows a relation between the D.C. voltage applied in a dark space and an amount of charge in the mixture layer. From the curve 52, it will be seen that, in a dark space, the amount of charge of the same polarity with that of the metal electrode increases with relation to an increase in the D.C. voltage. Curves 53 and 54 show a variation of an amount of charge when the voltage is applied in the same manner under exposure with light of 20 luxes and 100 luxes, respectively. In each case, the amount of charge increases at first with the increase in the D.C. voltage, but suddenly decreases at a certain voltage. The electrical device with such structure is suitable for recording a signal in the form of light.

5. Semiconductor when used as carrier transfer

Figure 19:
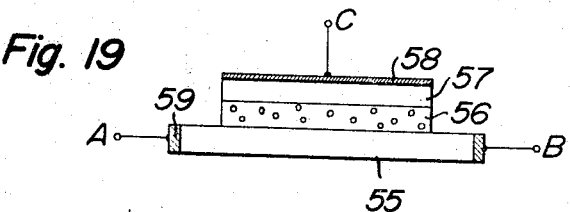
FIG. 19 is a schematic sectional view of still another embodiment of the invention.

In the foregoing description, a metal or a transparent conductive film is used as a carrier transformer which is brought into contact with a mixture of a semiconductor and an insulator. The following description refers to a case in which a semiconductor is used as a carrier transformer. In the case of the carrier transformer in the form of a semiconductor, an electric charge in the mixture exerts an influence on the carriers in the semiconductor and an entire new phenomenon is thereby developed. FIG. 19 shows a basic constitution of the present embodiment. The device of FIG. 19 comprises electrode terminals A, B, and C, a semiconductor 55, a mixture 56 of a semiconductor and an insulator, an insulator 57, and metallic electrodes 58 and 59. In FIG. 19, N-type silicon with a specific resistivity of 20Ω-cm. is used as the semiconductor 55, $Cu_2O$ being a P-type semiconductor as the semiconductor in the mixture 56, epoxy resin as the insulator in the mixture 56, a Mylar film as the insulator 57, a nickel plate as the electrode 58, and nickel-plated films as the electrodes 59.

Figure 20:
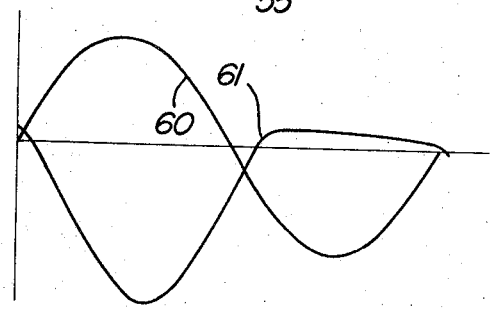
FIGS. 20 and 21 are graphic illustrations of various characteristics of the inventive device of FIG. 19.

When A.C. voltage is applied across the terminals A and C, an electromotive force is generated across the terminals A and B, and half-wave rectified current as shown in FIG. 20 is made to flow therethrough. A curve 60 therein shows a wave form of the A.C. voltage applied across the terminals A and C, while a curve 61 shows a wave form of the current flowing between the terminals A and B. The current is always subjected to half-wave rectification irrespective of types of the semiconductor 55 and the semiconductor contained in the mixture 56. The rectification characteristics are better at a higher A.C. frequency. It is quite surprising that rectification is made possible by the utilization of the unipolar charge storage effect of the invention without any provision of a separate rectifying layer.

Figure 21:
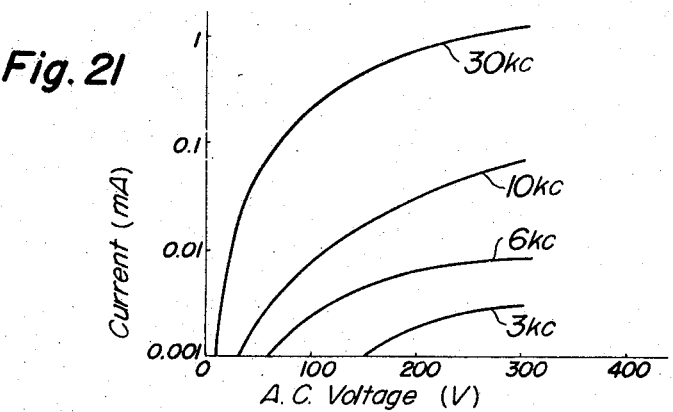

FIG. 21 shows a relation between a value of current flowing between the terminals A and B and an A.C. frequency. It will be seen that the current increases as the A.C. voltage and its frequency become higher. It is inferred that such phenomenon is caused by a non-equilibrium state of electric charges in the semiconductor 55. Or more precisely, when the terminal C is at a potential higher than that of the terminal A, electrons being main carriers in the semiconductor 55 are storaged in the mixture 56, and at the same time, the electron density becomes higher at the terminal A and lower at the terminal B. Therefore, the electrons move from the high density portion toward the low density portion, causing a flow of current. Then, in the subsequent half cycle, the electron density is now high at the terminal B and low at the terminal A and the electrons thereby move from the terminal B toward the terminal A. However, the electrons can not move since electrons are storaged in a greater amount in the mixture 56 on the side of the terminal A, and there is almost no flow of current.

6. Application

In the foregoing description, detailed explanation has been given with regard to the unipolar charge storage effect forming the basic principle of the invention, and this principle can readily be applied to provide various useful devices of electrophotoraphy or audio and video recording.

6–1. Electroluminescent device

In prior electroluminescent devices under practical use, powder of an electroluminescent phosphor mainly of ZnS series, are dispersed in a dielectric and the mixture is placed between electrodes. The dielectrics frequently used are an organic resin such as polyvinyl chloride, polyethylene or cellulose, an inorganic matter such as glass or porcelain, and high-voltage withstanding oil such as castor oil. Brightness of luminescence increases by adding a semiconductor in these electroluminescent layers. This is because the electric charge is injected into the semiconductor by the unipolar charge storage effect and the semiconductor in the mixture is thereby made to have a high potential. Therefore, an electric field produced by the high potential at the semiconductor exerts its action on the electroluminescent body for radiation of light. Since, in addition to this, the semiconductor is well mixed and dispersed deeply into the interior of the electroluminescent layer, the electroluminescent layer is subject to the influence of the strong electric field and an increased brightness of luminescence is thereby obtained. A further effect may be obtained by the use of a semiconductor which is white or has a color same as or analogous to a color that may be developed by the luminescence of the electroluminescent phosphor.

Especially in the case of the electroluminescent device, the insulator 6 as shown in FIG. 2 may be dispensed with since the semiconductor can not be mixed at such a great ratio as has been heretofore employed. However, the use of a $BaTiO_3$ layer as the insulator will further effectively increase the brightness.

Figure 22:
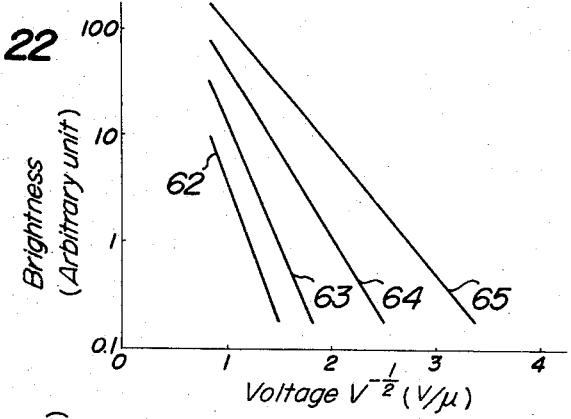
FIGS. 22 and 23 are graphic illustrations of characteristics of the inventive device as applied to an electroluminescent device.

ZnO:Cu, Al is used as an electrominescent body, while NiO, $Cu_2O$, and ZnO are used as a semiconductor, and 10 parts of the electroluminescent phosphor are mixed with 3 parts of the semiconductor. These mixtures are used as the mixture layer 5 of FIG. 2, while a mixture of $BaTiO_3$ and silicone resin is used as the insulator 6, a plate of transparent conductive glass as the electrode 7 and a silver paint film as the electrode 8. Both of the luminescent layer 5 and the insulator layer 6 have a thickness of 100 microns. FIG. 22 shows a relation between applied voltage at 60 cycles per second and brightness in these electroluminescent devices. In FIG. 22, curves 62, 63, 64 and 65 show a characteristic of a prior electroluminescent device which includes a fluorescent body alone and does not include any semiconductor, and characteristics of the inventive device including the semiconductor in the form of $CU_2O$, including the semiconductor in the form of NiO, and including the semiconductor in the form of ZnO, respectively. From these curves, it will be seen that the electroluminescent device of the invention including semiconductors therein shows the brightness of five to a hundred times that of the conventional device at a same applied voltage.

Among various factors for improving the brightness of an electroluminescent device, a higher density of electroluminescent phosphor and a higher dielectric constant of dielectric are most effective to obtain a greater brightness. To this end, a small amount of a ferroelectric substance such as barium titanate has heretofore been mixed into epoxy resin to improve the dielectric constant to thereby obtain a higher brightness. According to the invention, however, the addition of the semiconductor such as ZnO is effective to provide a greater brightness than in the previous one including barium titanate, in spite of a low dielectric constant. This is considered that the improved brightness by the addition of semiconductor can not be explained by a prior way of thinking based on the dielectric constant, but such greater brightness is obtained by the unipolar charge storage effect disclosed by the inventor. In order to minimize any loss in electroluminescence, it may be effective to mix a semiconductor having a high reflective power, but the brightness is increased even when a red semiconductor such as $Cu_2O$ is mixed with a electroluminescent phosphor radiating a greenish electroluminescence.

Figure 23:
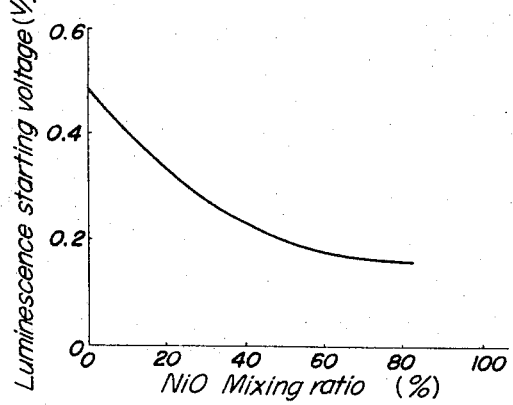

Among samples, the samples including semiconductors have a remarkably low electroluminescence starting voltage and becomes luminous at a low voltage. With regard to this matter, the inventor made the following experiment. The inventor employed NiO as a semiconductor and ZnS:Cu, Al as an electroluminescent phosphor, and a mixing ratio of the electroluminescent phosphor to NiO is varied to obtain the variation of electroluminescence starting voltage. The result is as shown in FIG. 23. From FIG. 23, it will be seen that the electroluminescence starting voltage is lowered to about one fourth of the initial voltage by the mixture of NiO of about 70%. This means how the mixture of the semiconductor is effective for improved electroluminescence. Even a sample including 75% NiO and 25% electroluminescent phosphor has a greater brightness than a sample of 100% electroluminescent phosphor. This will defeat the prior way of thinking that the brightness increases in proportion to a density of electroluminescent phosphor. A further improved brightness of electroluminescence can be obtained by mixing an electroluminescent phosphor, semiconductor and ferroelectric substance together.

6–2. Semiconductor device

Figure 24:
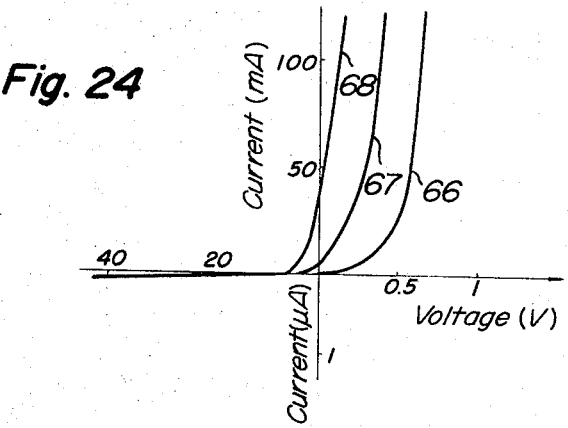
FIG. 24 is a graphic illustration of the characteristic of the inventive device as applied to a semiconductor device.

There may be considered various semiconductor devices utilizing the unipolar charge storage effect, but herein description will be made with regard to a controllable diode as a typical application. Generally, a semiconductor diode takes the form of a P–N junction type diode in which a P-type semiconductor is joined with a N-type semiconductor, or a point-contact diode in which a metal element is brought into rectifying contact with a semiconductor. Such diode necessarily has a rectifying characteristic in its voltage-current characteristics, which are mainly determined by materials of elements and a method of manufacture. Now, as shown in FIG. 19, a semiconductor is brought into contact with a mixture of a semiconductor and an insulator, and an insulator is brought into contact with the mixture. Then, an electrode A is brought into rectifying contact with the semiconductor 55, or a P–N junction is formed. With this arrangement, the rectifying characteristic between terminals A and B is made to vary by applying a signal across terminals A and C. Such action is similarly obtained by applying, for example, a signal voltage across the terminals B and C in FIG. 19, instead of applying it across the rectifying layer. However, it has been found that a greater variation in the diode characteristics can be obtained when the signal voltage is applied across the rectifying layer. Aluminum is welded to one end of N-type silicon (with specific resistivity of 0.2 $\Omega$-cm.) to form a P–N junction and the electrode A is provided thereat. A mixture layer comprising a P-type oxide semiconductor in the form of $Cu_2O$ and polystyrene is brought into contact with the N-type silicon forming the base. A Mylar film is superposed on the mixture layer and aluminum is fitted thereon by vacuum evaporation to provide the electrode C. The other end of the N-type silicon forming the base is gold plated and the electrode B is soldered in ohmic contact thereto. A signal such as an A.C. pulse is effective as the signal to be applied across the terminals A and C. A curve 66 in FIG. 24 shows the rectifying characteristic between the terminals A and B when no signal voltage is applied across the terminals A and C. Curves 67 and 68 show the rectifying characteristic between the terminals A and B when A.C. voltages of 50 volts and 100 volts at a frequency of 1 kilocycle are applied across the terminals A and C, respectively. From FIG. 24, it will be seen that forward current in the rectifying characteristic becomes greater as the signal voltage increases. Further, any variation in the frequency of the input signal varies the forward characteristic. Although the P-N junction is referred to in the above description, similar results may be obtained by bringing a metal element such as a gold wire into point contact with a semiconductor such as Si or Ge for forming a rectifying contact between the semiconductor and the metal. Although Si and Ge are used as the semiconductor, the effect of the invention may be equally effectively attained with a compound semiconductor such as GaAs, which is especially effective for use up to an ultra-high frequency range.

6-3. Electrophotography

Electrophotography has heretofore been carried out according to the following method. In the prior method, a tungsten wire electrode is disposed in spaced apart relation to a sensitive layer and high voltage of 5000 to 6000 volts is applied therebetween in the air to thereby cause a corona discharge. The sensitive layer comprising ZnO or Se is thereby charged uniformly all over its surface. By projecting a photo image on the sensitive layer, the charges on portions hit by the light solely disappear due to the photoconductivity of ZnO or Se. Therefore, charged portions and non-charged portions are formed on the sensitive layer and a latent image is produced by the distribution of the charges. Development of the image can be effected by applying there colored powder having charges opposite in polarity to the charges on the sensitive layer.

There has also been proposed a different type of electrophotography, that is, P.I.P. applied electrophotography which utilizes the persistent internal polarization effect of a fluorescent phosphor. According to such method, voltage of about 500 to 1000 volts is applied on sensitive paper having therein a fluorescent phosphor to charge the sensitive paper by the persistent internal polarization effect of the fluorescent phosphor. By projecting an image thereon, the charges on portions hit by the light solely disappear and a latent image of electric charges is formed on the sensitive paper. A photograph is obtained by developing the image in a manner similar to the former method. In any of both methods, the latent image on the surface of the sensitive paper is defined by charged portions and non-charged portions. Such manner of charge distribution is defective in that boundaries between the charged portions and the non-charged portions are not so clearly defined. Due to such drawback, in the P.I.P. applied electrophotography, an electric field opposite to the one used in the charging operation is simultaneously applied during the image projection to form the latent images on the surface of the sensitive layer by the charges of opposite polarities to each other to thereby improve the sharpness of the image. This method, however, involves a troublesome operation of changing over the electric field.

Figure 25:
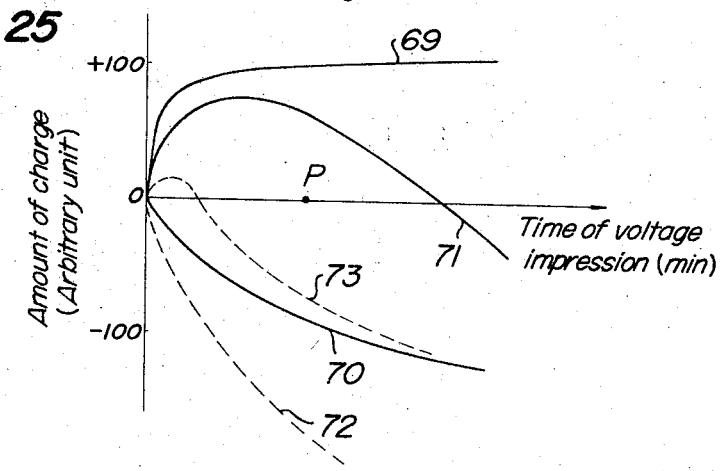
FIG. 25 is a graphic illustration of the characteristic of the inventive device as applied to electrophotography.

According to the invention, however, latent images with charges of opposite polarities to each other can be formed on the surface of sensitive paper by the utilization of the charge storage effect without any troublesome procedure of changing over the electric field. In the invention, a material adapted for the purpose comprises a mixture of a semiconductor and a fluorescent phosphor dispersed in an insulator and is incorporated in a structure as shown in FIG. 2. Fluorescent phosphors showing the persistent internal polarization effect are preferred, which are $(Zn, Cd)S$, $ZnS$, $CdS$ and the like. FIG. 25 shows a relation between an amount of charge and a time of voltage application in various samples. Measurement of the amount of charge is taken at the anode side. A curve 69 therein represents a case of a sample including a mixture of a semiconductor and an insulator. It will be seen that charges of the same polarity with that of the electrode with which the mixture contacts are formed in the mixture and the unipolar charges are storaged in the sample, thus showing the unipolar charge storage effect of the invention. The amount of charge is almost free from the influence of light.

A curve 70 in FIG. 25 represents a case of a sample including a mixture of a fluorescent phosphor and an insulator, corresponding to the case of the prior P.I.P. applied electrophotography, and shows an amount of charge in a dark space. A curve 71 shows an amount of charge in a dark space in a sample including a fluorescent phosphor and a semiconductor dispersed in an insulator. It will be seen that the polarity of charge is reversed after a certain time. This is because the curve 71 is actually a resultant curve of the curves 69 and 70. A curve 72 shows a variation in the amount of charge when light is projected on the mixture of the fluorescent phosphor and the insulator simultaneously with the application of voltage, and it will be seen that the amount of charge increases by application of light.

When now light is applied to the mixture of the fluorescent phosphor, semiconductor and insulator, an increase in the amount of charge takes place solely in the fluorescent phosphor component and a curve thereby obtained takes the form of a combination of the curves 69 and 72, or a resultant curve 73 in which it will be seen that the polarity of the charge is reversed in a short time. When, therefore, the mixture of the fluorescent phosphor and the semiconductor is used as a material for electrophotography, and an image is projected thereon under application of voltage, portions which are not radiated by the light are charged in a manner as shown by the curve 71. Then, when the application of voltage and image projection are ceased at a time corresponding to point P, latent images of positive and negative charges are formed on the surface of the sample on the anode side thereof. A positive and a negative image can be obtained by applying colored powder which is charged negative and positive, respectively. According to the invention, an image of high sharpness can easily be obtained by virtue of the latent images by the positive and negative charges, unlike the prior electrophotography which relies on a corona discharge. Further, the well-known P.I.P. applied electrophotography requires a troublesome operation of reversing the electric field, but according to the invention, the application of voltage and image projection are simultaneously made so that latent images of positive and negative charges can be obtained at a time. The invention is further advantageous in that a working voltage of less than 800 volts suffices.

6-4. Audio and video recording device

Figure 26:
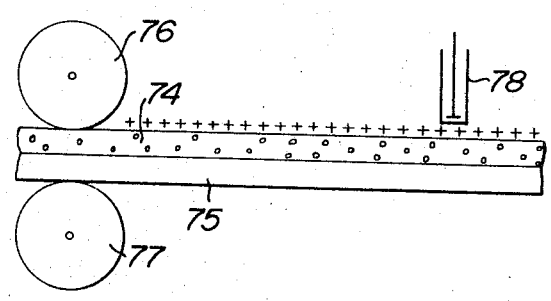
FIG. 26 is a schematic layout of the inventive device as applied to audio and video recording.

A prior video recording method comprises applying an electrical signal corresponding to pictures to a tape having thereon a ferromagnetic material to thereby record the signal in the form of a magnetic signal. According to the invention, however, video recording can be effected in a simple and inexpensive manner by the utilization of the unipolar charge storage effect. A tape 75 carrying thereon a mixture 74 having the unipolar charge storage effect is made to pass between electrodes 76 and 77 as shown in FIG. 26. The mixture 74 is composed of a semiconductor and an insulator, and the tape 75 is made of an insulating material such as a plastic, while the electrodes 76 and 77 are of brass of cylindrical shape. When voltage is applied across the electrodes 76 and 77, positive or negative charges are formed in the mixture 74 depending on the positive or negative polarity of the electrode 76. The amount of charge so formed corresponds to the magnitude of the applied voltage. By applying the voltage signal in the form of a video signal, charges corresponding to the video signal are formed on the tape. The charged tape can be preserved for an extremely long time in a dark space and for a fairly long time in a light space too. The charges will however disappear by application of an intense infrared ray.

The charges thus formed on the tape are then detected by a detector 78, taken out in the form of an alternating current corresponding to potentials on the tape and reproduced as pictures. An advantageous feature in this case is that the detector 78 need not abut the tape, which is therefore free from being injured. Further, the charges still remain on the tape even after they have been taken out as the electrical signal by the detector 78 and remain effective for repeated use. The charges carried on the tape can be erased by the application of an intense infrared light thereto and the tape is ready for subsequent video recording. In accordance with the same principle, sound can likewise be recorded on the tape. By applying a voltage corresponding to a sound current to the tape, electrical charges corresponding to the sound can be formed on the tape. The tape is then fed past the detector, which takes out the charges in the form of an electrical signal for reproduction of the sound. Other features can be derived as in the case of the video recording.

7. Summary

The particularities of the invention described in the above are summarized as follows:

(1) The invention relates to an electrical device which comprises a mixture of at least a semiconductor and an electrical insulator, a carrier transformer brought into contact with the mixture, another electrical insulator brought into contact with the mixture on the opposite side of the carrier transformer, and an electrode disposed either directly or indirectly on the another electrical insulator on the opposite side of the mixture.

(2) The device according to the invention has a prominent effect that an electrical charge is stored in the mixture of the semiconductor and the insulator, which charge has the same polarity with that of the carrier transformer with which the mixture is in contact.

(3) An amount of charge storaged in the mixture varies depending on applied voltage and a time of voltage application, and can be preserved even in a light space.

(4) When the semiconductor contained in the mixture is of P-type in which holes act as majority carriers, a remarkably greater amount of charge can be obtained than with a N-type semiconductor.

(5) By the addition of a fluorescent phosphor to the mixture, the amount of charge stored therein can be varied by application of light thereto.

(6) By the addition of a ferroelectric substance to the mixture, the amount of charge stored in the mixture can be increased.

(7) By the addition of both of the fluorescent phosphor and the ferroelectric substance to the mixture, the increased amount of charge stored therein can be varied application of light thereto.

(8) By the addition of a metal, which shows a photovoltaic effect in combination with the semiconductor included in the mixture, to the mixture, the amount of charge stored therein can be increased by application of light thereto.

(9) By bringing the mixture into contact with an insulator such as polystyrene or polyethylene having little residual charge due to absorption current, the amount of stored charge can be abruptly varied by application of light and A.C. voltage to the mixture.

(10) By interposing a fluorescent layer between the insulator and the transparent conductive glass plate, the amount of charge stored in the mixture can be varied by application of light thereto.

(11) By interposing a photoconductor layer between the insulator and the transparent electrode, the amount of charge stored in the mixture can be varied by application of light thereto.

(12) When the mixture of the semiconductor and the insulator is brought into contact with the carrier transformer in the form of another semiconductor and A.C. voltage is applied across the another semiconductor and the mixture, a half-wave rectified electromotive force is generated in the another semiconductor.

(13) By mixing an electroluminescent phosphor with a semiconductor, an electroluminescent layer having a high brightness of electroluminescence can be obtained.

(14) By bringing a semiconductor diode into contact with the mixture of the semiconductor and the insulator, an device can be obtained in which the forward characteristic in its rectification characteristics is variable.

(15) By adding a fluorescent phosphor to the mixture of the semiconductor and the insulator, latent images of positive and negative charges can simultaneously be formed and thus it is possible to obtain a sensitive layer having an extremely high resolving power and sensitivity quite suitable for electrophotography.

(16) The device of the invention, when applied to audio and video recording, can provide a high degree of resolving power and fidelity.

From the foregoing detailed description, it will be understood that the present invention is based on a principle that a mixture of at least a semiconductor and an insulator is brought into contact with a carrier transformer, and electric charges are injected into the mixture from the carrier transformer in contact with the mixture, the charges being prevented from further movement by another insulator brought into contact with the mixture and thus stored in the mixture. This principle has not been known at all in the prior art, and therefore the element of the invention based on this principle is quite novel.

What is claimed is:

1. An electric charge storage element comprising a mixture of at least an electrical insulator and a semiconductor, said semiconductor being selected from the group consisting of $Cu_2O$, $ZnO$, $NiO$, $PbO$, $Si$, $Ge$, $ZnSe$, and anthracene; a carrier transformer disposed in direct contact with one side of said mixture, a second electrical insulator disposed on the opposite side of said mixture from said carrier transformer, and an electrode disposed on said second electrical insulator on the opposite side from said mixture.

2. An electric charge storage element according to claim 1, wherein said electrode is directly brought into contact with said another insulator.

3. An electric charge storage element according to claim 1, wherein said electrode is indirectly brought into contact with said another insulator through another layer interposed therebetween.

4. An electric charge storage element according to claim 1, wherein said semiconductor included in said mixture takes the form of a P-type semiconductor.

5. An electric charge storage element according to claim 1, wherein said mixture further includes a ferroelectric substance therein.

6. An electric charge storage element according to claim 1, wherein said another electrical insulator is a material which has little residual electrical charge due to absorption current.

References Cited
UNITED STATES PATENTS

| | | | |
|---|---|---|---|
| 2,698,915 | 1/1955 | Piper | 313—108 X |
| 2,798,823 | 7/1957 | Harper. | |
| 2,836,766 | 5/1958 | Halsted. | |
| 2,856,553 | 10/1958 | Henisch | 313—108 |
| 2,870,342 | 1/1959 | Walker et al. | 250—213 |
| 2,874,308 | 2/1959 | Livingston | 250—213 |
| 2,894,854 | 7/1959 | MacIntyre | 313—108 X |
| 3,015,036 | 12/1961 | Butler | 250—213 |
| 3,030,542 | 4/1962 | Knochel et al. | 313—108 |
| 3,037,137 | 5/1962 | Motson | 313—108 |
| 3,048,732 | 8/1962 | Lehmann et al. | 313—108 |
| 3,052,810 | 9/1962 | Mash | 313—108 |
| 3,059,118 | 10/1962 | Koury | 250—213 |
| 3,104,339 | 9/1963 | Koury | 313—108 |
| 3,107,315 | 10/1963 | Wolfe et al. | 313—108 X |
| 3,142,594 | 7/1964 | Bahe | 148—33.4 |
| 3,204,159 | 8/1965 | Bramley et al. | 317—235 |

JOHN W. HUCKERT, *Primary Examiner.*

R. SANDLER, *Assistant Examiner.*